United States Patent [19]

Nakayama

[11] Patent Number: 5,074,820
[45] Date of Patent: Dec. 24, 1991

[54] STUFFED, VIBRATING, SOUNDING, SITTING TOY

[75] Inventor: Toshiaki Nakayama, Tokyo, Japan

[73] Assignee: Sega Enterprises, Ltd., Tokyo, Japan

[21] Appl. No.: 385,801

[22] Filed: Jul. 26, 1989

[30] Foreign Application Priority Data

Dec. 19, 1988 [JP] Japan .................... 63-164310[U]

[51] Int. Cl.⁵ .................. A63H 33/00; A63H 3/28; A63G 17/00; A61H 7/00

[52] U.S. Cl. .................... 446/29; 446/297; 446/302; 446/369; 297/181; 272/53.1; 272/52.5; 128/36; 128/33

[58] Field of Search ........... 272/53.1, 52.5; 128/33, 128/36; 297/181, 214; 446/29, 28, 26, 268, 297, 299, 302, 303, 404, 409, 369, 370

[56] References Cited

U.S. PATENT DOCUMENTS

| 2,634,975 | 4/1953 | Hams | 272/53.1 |
| 2,637,319 | 5/1953 | Brukne | 128/33 X |
| 2,680,019 | 6/1954 | SeBastion | 272/53.1 X |
| 2,722,418 | 11/1955 | Small | 272/53.1 |
| 3,384,074 | 5/1968 | Rautiola et al. | 446/297 X |
| 3,737,196 | 6/1973 | Bodor | 297/181 |
| 3,826,250 | 7/1974 | Adams | 128/33 |
| 4,055,170 | 10/1977 | Nohmura | 128/33 |
| 4,228,793 | 10/1980 | Ramey | 128/33 |
| 4,289,307 | 9/1981 | Marshall, Jr. et al. | 272/52.5 |
| 4,451,911 | 5/1984 | Klose et al. | 446/303 X |
| 4,785,797 | 11/1988 | Cuervo | 128/33 |
| 4,820,236 | 4/1989 | Berliner et al. | 446/369 |

FOREIGN PATENT DOCUMENTS

| 543645 | 7/1957 | Canada | 272/53.1 |
| 614322 | 2/1961 | Canada | 272/53.1 |
| 688538 | 3/1953 | United Kingdom | 272/53.1 |

Primary Examiner—Robert A. Hafer
Assistant Examiner—D. Neal Muir
Attorney, Agent, or Firm—Price, Gess & Ubell

[57] ABSTRACT

Disclosed is a stuffed toy comprising a main switch turned on in response to a load applied externally, a vibrator activated when the main switch is turned on to vibrate at least a part of the body of the stuffed toy, and a sound generator generating a sound to the outside while the vibrator is vibrating.

17 Claims, 3 Drawing Sheets

STUFFED, VIBRATING, SOUNDING, SITTING TOY

BACKGROUND OF THE INVENTION

1. Field of the Invention

The present invention relates to a stuffed toy and, more particularly, to a large-sized stuffed toy which is designed so that a child can mount thereon for play action.

2. Description of the Prior Art

Stuffed toys are popular with a wide age group. Particularly, for small children, stuffed toys, for example, stuffed horses, automobiles, trains, etc., which are the same in size or a little larger than them, are very enjoyable because they can actually mount on these toys.

These conventional large-sized stuffed toys suffer, however, from the problem that they cannot attract the children's interest for a long time. More specifically, since the conventional stuffed toys do not move by themselves, small children, sooner or later, lose interest in mounting thereon and the stuffed toys become mere ornaments.

SUMMARY OF THE INVENTION

It is a primary object of the present invention to provide a stuffed toy which has overcome the above-described problem of the prior art.

To this end, the present invention provides a stuffed toy comprising: a main switch turned on in response to a load applied externally; a vibrator activated when the main switch is turned on to vibrate at least a part of the body of the stuffed toy; and a sound generator generating a sound to the outside while the vibrator is vibrating.

By virtue of the above-described arrangement, if a child or other individual mounts on that portion of the stuffed toy body where the main switch is installed and applies a load thereto, the vibrator and the sound generator are activated, so that at least a part of the stuffed toy body is vibrated and a sound is generated.

DETAILED DESCRIPTION OF THE PREFERRED EMBODIMENT

One embodiment of the present invention will be described below with reference to the accompanying drawings.

Figure 1:
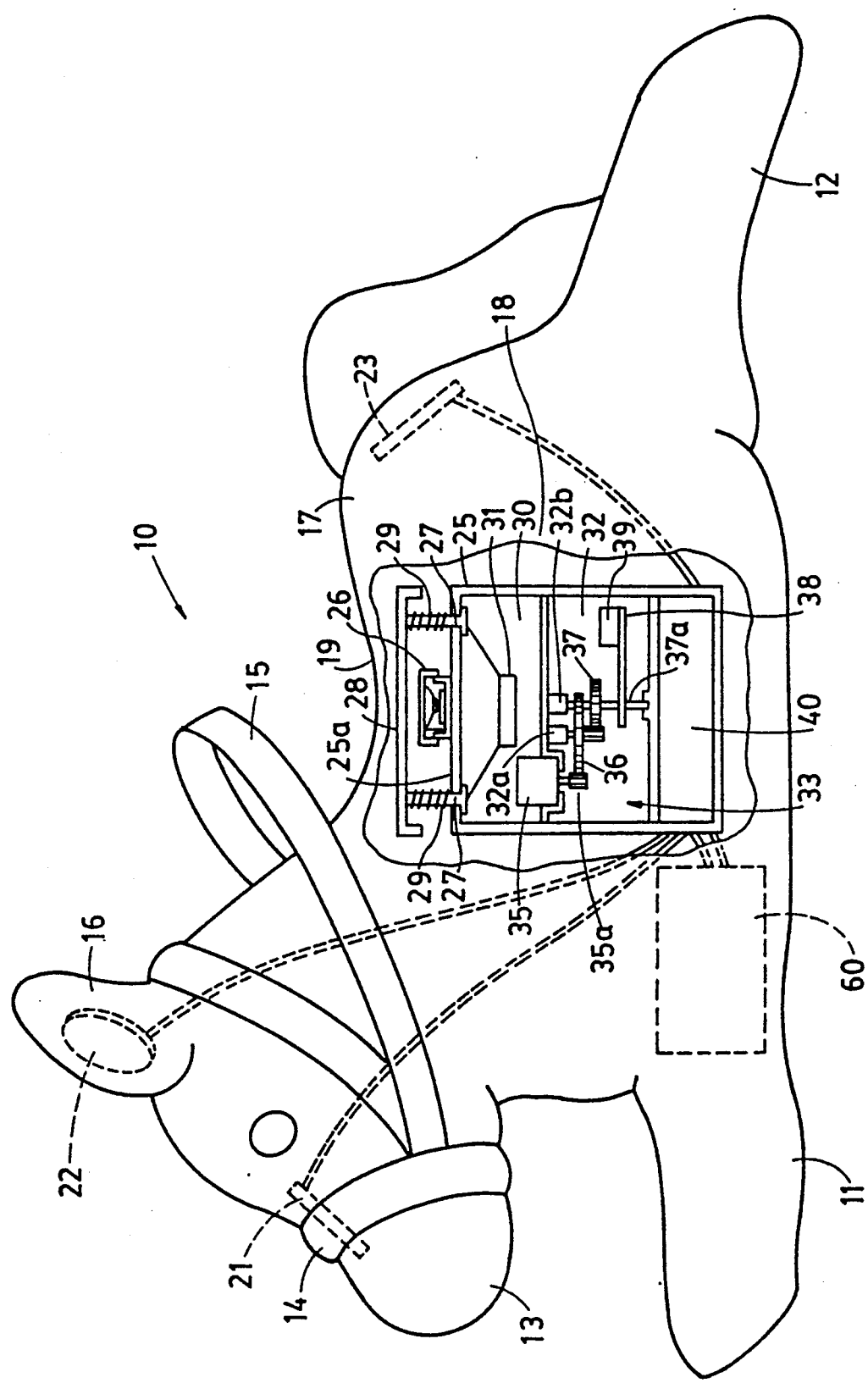
FIG. 1 is a partially-sectioned side view of one embodiment of the present invention.

FIG. 1 is a side view of one embodiment of the present invention, which is partially sectioned to show the internal arrangement thereof.

Referring to the figure, the stuffed toy 10 is formed in the shape of a horse and designed so that it lies on its stomach with its forelegs and hind legs stretched horizontally.

A noseband 14 is attached to the nose 13 of the stuffed toy 10. Reins 15 are connected to the noseband 14.

A switch 21 is disposed inside the nose 13 having the noseband 14 wrapped around it so that the switch 21 is turned on in response to pressure applied thereto from the noseband 14 when pulled through the reins 15.

Switches 22 and 23 which are similarly turn on when pressed from the outside are disposed inside the ear 16 and the croup 17, respectively.

A sound and vibration generator 25 is disposed inside the trunk 18.

The vibration and sound generator 25 is formed in a substantially cylindrical shape. A main switch 26 is attached to the upper side 25a of the generator 25, the main switch 26 being arranged to be turned on in response to pressure applied thereto from the upper side thereof.

A pressure plate 28 is provided at the upper side of the main switch 26, the pressure plate 28 being supported by shafts 27 which extend vertically through two end portions, respectively, of the upper side 25a of the generator 25. The pressure plate 28 is biased upward by the action of springs 29 which are wound around the shafts 27, respectively.

Accordingly, when a load is applied to the back 19 of the stuffed toy 10, the pressure plate 28 moves downward, thus causing the main switch 26 to turn on.

The interior of the vibration and sound generator 25 is divided into three chambers. In the upper chamber 30, a speaker 31 is installed with its face directed upward; in the intermediate chamber 32, a vibrator 33 is formed.

The vibrator 33 has a motor 35 which is installed with a rotating shaft 35a thereof extending into the intermediate chamber 32 from the upper chamber 30. The rotation of the motor 35 is transmitted to an eccentric plate 38 after the speed of rotation has been reduced through two reduction gears 36 and 37 which are supported by respective bosses 32a and 32b in the intermediate chamber 32, the eccentric plate 38 being attached at one end thereof to the shaft 37a of the reduction gear 37.

A weight 39 is attached to the other end portion of the eccentric plate 38. Thus, as the eccentric plate 38 rotates in response to the rotation of the motor 35, the whole vibration and sound generator 25 vibrates horizontally.

Figure 2:
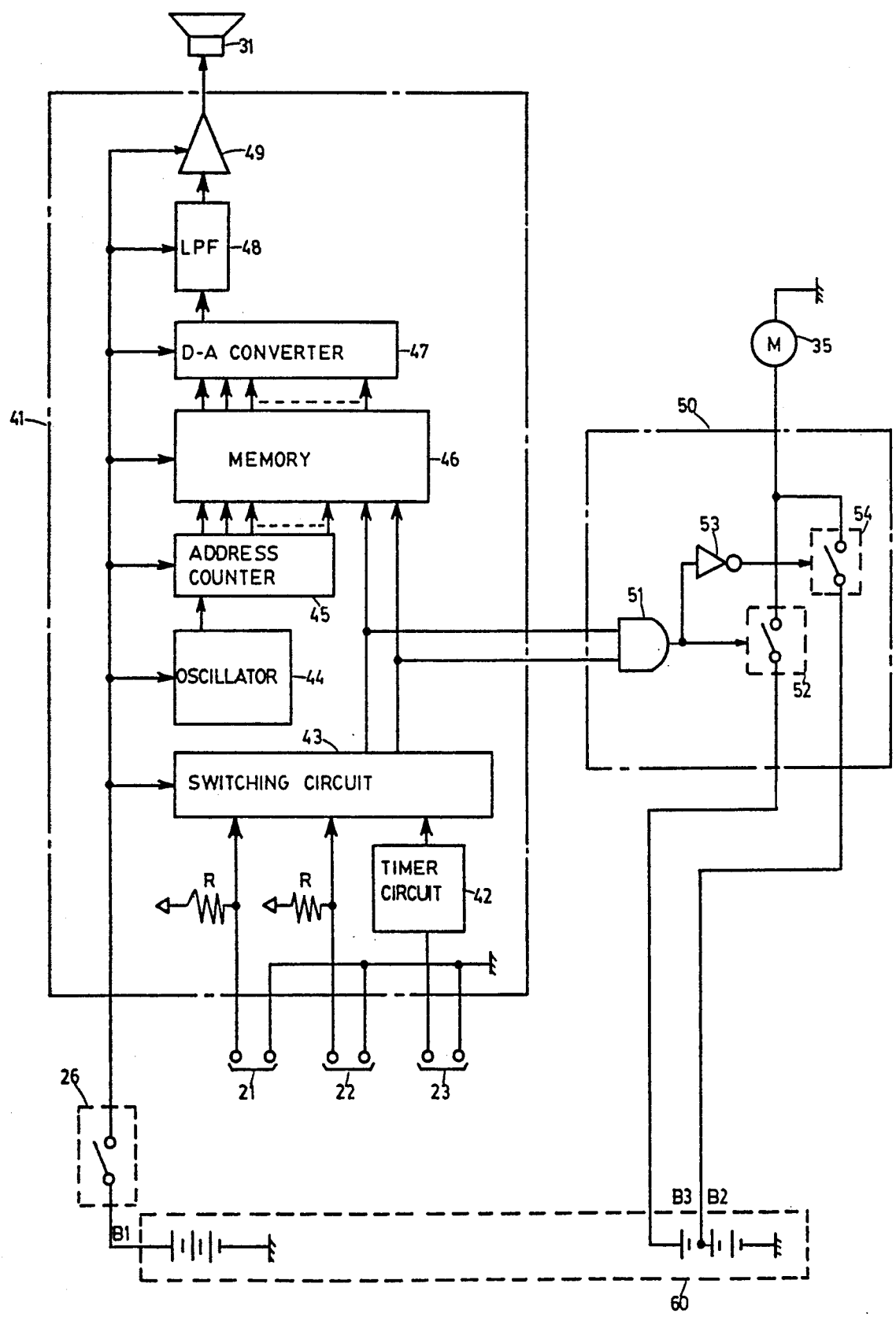
FIG. 2 is a block diagram showing an essential part of the embodiment.
Figure 3:
FIG. 3 is a side view of one embodiment of the present invention.

In the lower chamber 40 is accommodated a sound generator 41 and a motor switching circuit 50 such as those shown in FIG. 2.

Referring to FIG. 2, the sound generator 41 is arranged to operate on electric power supplied from a battery B1 through the main switch 26.

The reference numeral 42 denotes a timer circuit which outputs a voltage of level "L" for a predetermined period of time when the switch 23 turns on.

The reference numeral 43 denotes an operation switching circuit which switches two output levels from one to the other in accordance with the states of the timer circuit 42 and the two switches 21 and 22 which are pulled up by respective resistors R. For example, when the main switch 26 is ON and the other switches 21 to 23 are OFF, the output of the circuit 43 is set to "00"; when the switch 21 is ON, the output is set to "01"; when the switch 22 is ON, the output is set to "10"; and when the switch 23 is ON and the timer circuit 42 is in an operative state, the output is set to "11".

The reference numeral 44 denotes an oscillator which outputs a clock signal of a predetermined frequency, and 45 an N-bit address counter which counts the number of pulses of the clock signal and outputs the count of signal pulses.

The reference numeral 46 denotes a memory which is supplied with the output from the operation switching circuit 43 as being high-order address bits and outputs sound data corresponding to the output from the address counter 45. The memory 46 has previously been stored with sound data in four memory regions which are selected in accordance with the states of the high-order address bits.

More specifically, the region that is selected when the high-order address bits are "00" is stored with digital data corresponding to the sound of a trotting horse, the data being stored in order from the low-order address; the region that is selected when the high-order address bits are "01" is stored with data corresponding to the sound of whining; the region that is selected when the high-order address bits are "10" is stored with data corresponding to a simple melody; and the region that is selected when the high-order address bits are "11" is stored with data corresponding to the sound of a galloping horse.

The reference numeral 47 denotes a DA converter which converts the digital data read out from the memory 46 into an analog signal, 48 a low-pass filter which removes noise from the output from the DA converter 47, and 49 an amplifier which amplifies the signal from the low-pass filter 48 to generate a sound from the speaker 31.

The switching circuit 50 is arranged to switch two levels of power supplied to the motor 35 of the vibrator 33 from one to the other. More specifically, when the output from the operation switching circuit 43 is "11", a switch 52 is closed in response to the "H" level output from an AND circuit 51, thereby supplying the motor 35 with the voltage from two batteries B2 and B3 connected in series, and thus causing the motor 35 to rotate at high speed, whereas, when the output from the operation switching circuit 43 is any other than "11", a switch 54 is closed in response to the "H" level output from an inverter 53 to supply the voltage from the battery B2 alone, thereby rotating the motor 35 at normal speed.

It should be noted that these batteries B1 to B3 are accommodated in a battery casing 60 disposed inside the stuffed toy 10.

When a child mounts on the back 19 of the stuffed toy 10 having the above-described arrangement, the pressure plate 28 is lowered by the load, thus turning on the main switch 26.

In consequence, the output from the operation switching circuit 43 is "00", so that the motor 35 of the vibrator 33 rotates at normal speed, causing the trunk 18 to vibrate. In addition, the sound of a trotting horse is continuously generated from the speaker 31.

If, in this state, the reins 15 are pulled, the noseband 14 causes the switch 21 to turn on. In consequence, the memory regions in the memory 46 are switched over so that the sound of whining is generated in place of the sound of a trotting horse as long as the reins 15 are pulled. When the reins 15 are slackened, the sound of whining is changed back to the sound of a trotting horse.

If the rider slaps the stuffed toy 10 on the croup 17, the switch 23 turns on to activate the timer circuit 42 and the output of the operation switching circuit 43 changes to "11", thus causing the motor to rotate at high speed. Accordingly, the trunk 18 of the stuffed toy 10 vibrates at high speed and the sound of a galloping horse is generated for a predetermined period of time.

If the ear 16 of the stuffed toy 10 is touched, a melody is sounded as long as it is touched.

Although in the foregoing embodiment the main switch 26, the vibrator 33 and the sound generator 41 are formed together in one unit, these members may be disposed separately from each other. For example, the main switch 26 and the vibrator 33 may be disposed inside the trunk 18 and the neck, respectively.

The arrangement of the vibrator 33 is not necessarily limited to that in the described embodiment. The vibrator 33 may be arranged to swing vertically or back and forth.

The arrangement of the sound generator 41 is not necessarily limited to that in the described embodiment, either, and it is also possible to employ a tape recorder type device or other imitation sound generator.

Although in the foregoing embodiment the present invention is applied to a stuffed toy horse, it should be noted that the present invention may, of course, similarly be applied to other stuffed toy animals and also to stuffed toy vehicles, for example, automobiles and trains.

Since the stuffed toy according to the present invention is arranged such that it vibrates and a sound is generated when the main switch is activated in response to application of a load, as described above, if a child mounts on the stuffed toy, he feels as if the stuffed toy were actually moving and therefore can enjoy himself for a long time without losing interest in the play.

I claim:

1. A stuffed toy comprising:
   a main switch turned on in response to a load applied externally of said body;
   a vibrator contained within the stuffed toy, which vibrator is activated when said main switch is turned on to vibrate at least a part of said stuffed toy; and
   a sound generator means to generate one of a plurality of stored sounds to the exterior of the toy;
   at least one secondary switch means for altering the vibrator's vibration and the sound generator means generated;
   power means connecting all switches, the sound generating means, and the vibrator to drive said vibrator and said sound generating means upon activation of at least said main switch.

2. A stuffed toy according to claim 1, wherein vibrating modes of said vibrator are changed from one to another in response to the operation of said secondary switch which is different from said main switch.

3. A stuffed toy according to claim 1 wherein said sound generator generates a different sound in response to the operation of the secondary switch which is different from said main switch.

4. A stuffed toy according to claim 1 wherein vibrating modes of said vibrator are changed from one to another in response to the operation of a switch which is different from said main switch.

5. A stuffed toy according to claim 1 wherein said sound generator generates a different sound in response to the operation of a switch which is different from said main switch.

6. A stuffed toy according to claim 1 further including a housing member configured to simulate an animal.

7. A stuffed toy according to claim 1 including a housing member configured to simulate a vehicle.

8. A stuffed toy according to claim 1 wherein the housing member is configured to simulate a horse.

9. A toy structure simulating a real object upon which a child can rest his/her weight, comprising:
  a stuffed housing member having an exterior configuration simulating a real object;
  means for providing vibration to the housing member;
  a plurality of switch elements positioned to be activated response to child-initiated forces at different locations about the housing member;
  audio means capable of generating a plurality of different sounds, each sound being related to the activation of a different switch element, and
  control means for responding to the activation of each switch element to activate the audio means to produce a correspondingly related sound.

10. A toy structure according to claim 9 wherein the means for providing vibration includes an on-off switch responsive to the child's weight and a motor activated by the switch to vibrate the housing member.

11. A toy structure according to claim 10 wherein the housing member is configured to simulate an animal with the on-off switch located on a back portion of the animal.

12. A toy structure according to claim 11 wherein the audio means includes stored signals capable of simulating a characteristic sound of the animal.

13. A toy structure according to claim 9 wherein the control means includes stored signals capable of simulating movement of the animal.

14. A toy structure according to claim 13 wherein a switch is provided on a simulated head of the animal and another switch is provided on a simulated croup of the animal.

15. A simulated play horse toy that a child can sit upon to generate vibration and characteristic sounds, comprising:
  a stuffed housing member having an exterior configuration of a horse with a head, back and croup portion;
  a motor mounted in the housing member and capable of transmitting vibration to the child when activated;
  audio means for providing a plurality of predetermined sounds including a sound characteristic of a horse and a sound characteristic of horse hoofs upon a support surface;
  an on-off switch operatively connected to the back of the horse for activating the motor;
  at least a pair of switch mechanisms mounted on portions of the simulated horse housing member, each switch mechanism associated with activating a specific characteristic horse sound, and
  control means for responding to the activation of each switch mechanism to activate the audio means to produce a correspondingly related sound.

16. A simulated play horse toy according to claim 15 further including reins attached to the horse's head.

17. A simulated play horse toy according to claim 16 further including one of the switch mechanisms attached to the reins to cause the control means to activate the audio means to provide a whinnying horse sound, and another of the switch mechanisms mounted on the croup portion to cause the control means to activate the audio means to provide a galloping sound when activated, and means for increasing the motor transmitted movement when the croup switch mechanism is activated.

* * * * *